Dec. 6, 1927.
H. W. BOLENS
POWER LAWN MOWER
Filed Nov. 18, 1921
1,651,579
3 Sheets-Sheet 2
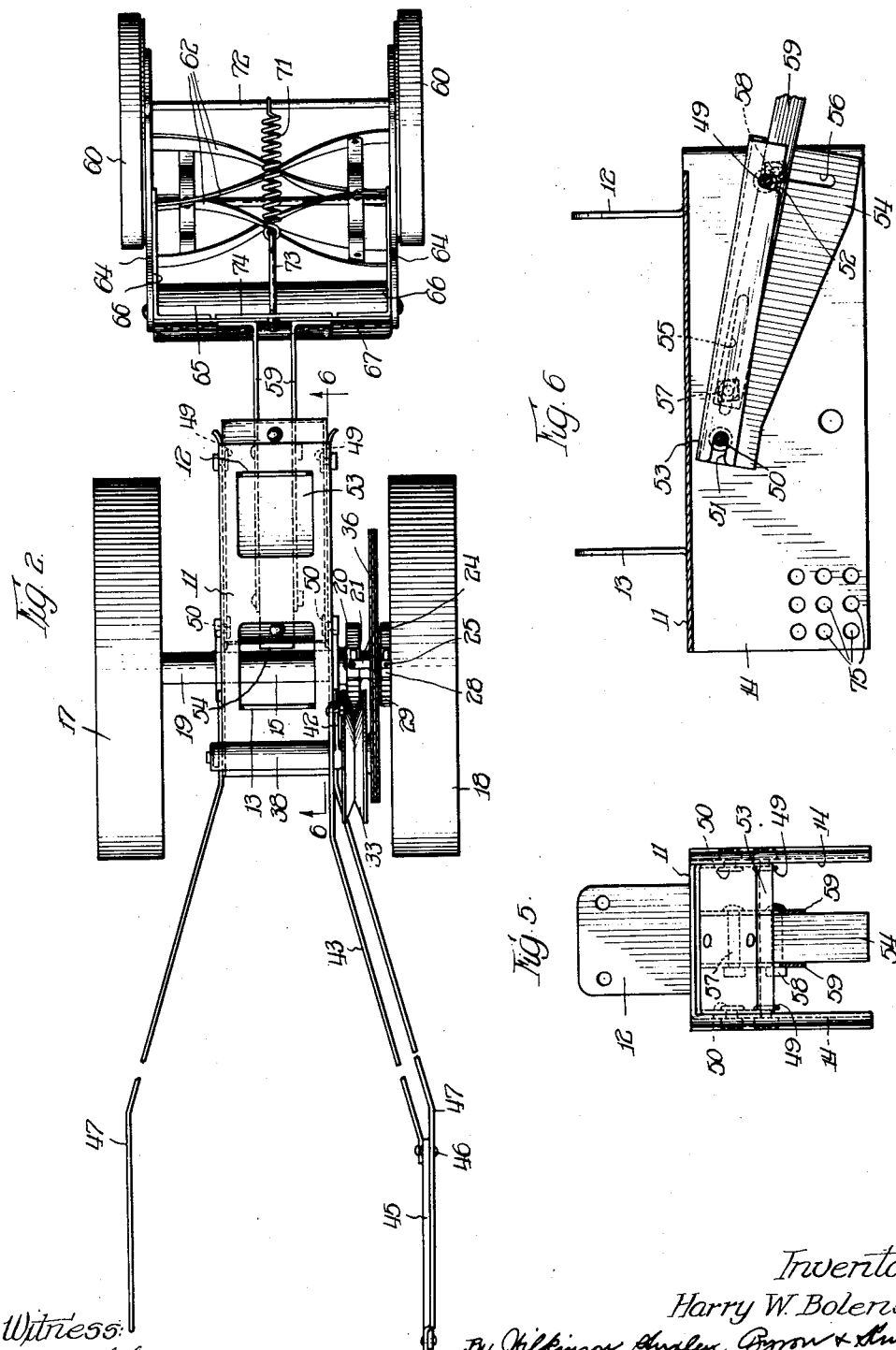
Witness:
A. Burkhardt
Inventor:
Harry W. Bolens,
By Wilkinson, Huxley, Byron & Knight
Attys Dec. 6, 1927.
H. W. BOLENS
1,651,579
POWER LAWN MOWER
Filed Nov. 18, 1921    3 Sheets-Sheet 3
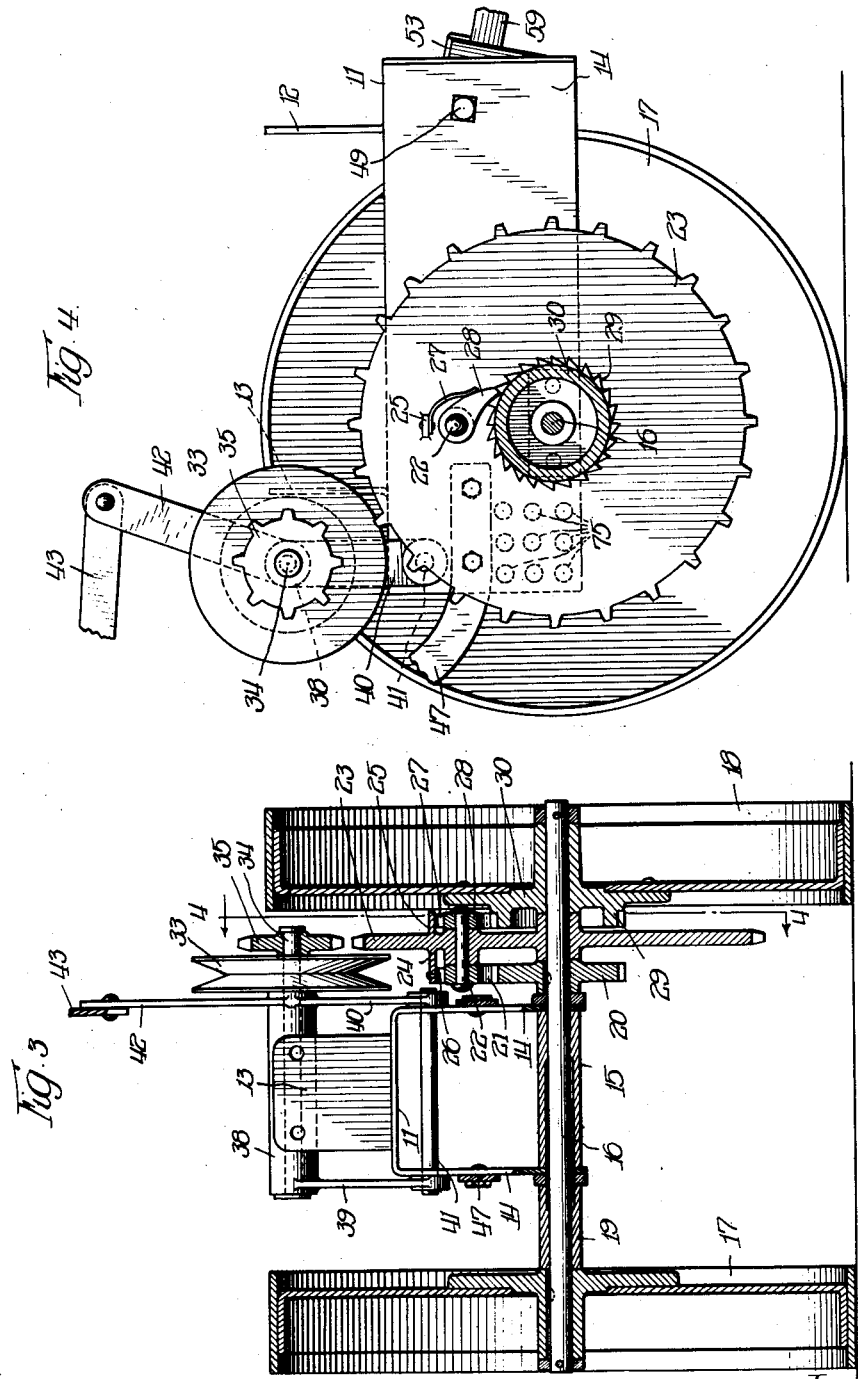
Witness:
A. Burkhardt.
Inventor:
Harry W. Bolens,
By Wilkinson, Huxley, Byron & Knight
Attys.

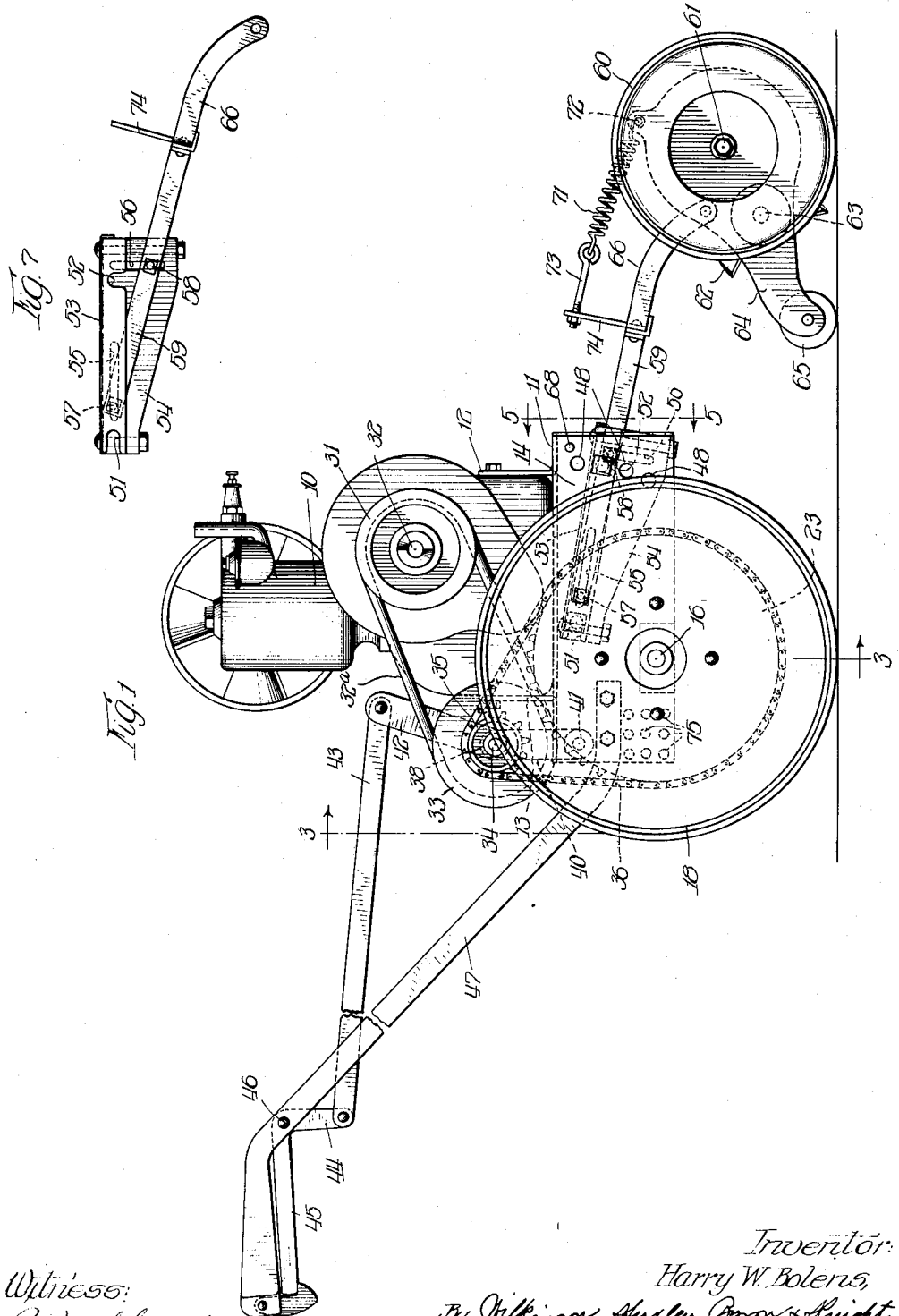

Patented Dec. 6, 1927.

1,651,579

UNITED STATES PATENT OFFICE.

HARRY W. BOLENS, OF PORT WASHINGTON, WISCONSIN.

POWER LAWN MOWER.

Application filed November 18, 1921. Serial No. 516,196.

This invention relates to power lawn mowers.

One object of this invention is to provide a simple, efficient and durable power unit and attachment means therefor whereby lawn mowers of various makes and sizes may be quickly and easily attached to and detached from the power unit and whereby the various parts cooperate and function in a manner to meet all of the requirements for successful commercial use.

Another object is to provide a simple power unit to which lawn mowers of various makes and sizes and garden tools can be easily attached and detached.

These and other objects are accomplished by means of the arrangement disclosed by the accompanying sheets of drawings, in which—

Figure 1 is a side elevation of a power lawn mower combination embodying my invention;

Figure 2 is a top plan view on the same arrangement;

Figure 3 is a fragmentary end elevation, parts being in section, the section being taken in the planes of the irregular line 3—3 of Figure 1;

Figure 4 is a sectional view taken in the plane of line 4—4 of Figure 3;

Figure 5 is a detailed view, parts being in section, the section being taken in the plane of line 5—5 of Figure 1;

Figure 6 is a detailed sectional view taken in the plane of line 6—6 of Figure 2; and Figure 7 is a side elevation of the holding frame which is detachably connected to the main frame and in which the mower handle bars are movably supported.

The various novel features of the invention will be apparent from the following description and drawings, and will be particularly pointed out in the appended claims.

Referring to the figures of the drawings, it will be noted that I have disclosed my invention in connection with a power lawn mower in which the power unit includes an engine 10 mounted upon a main frame 11, preferably made of sheet steel and having struck-up portions 12 and 13 to which the engine 10 is secured. This main frame 11 is channel-shaped in section, having depending sides 14 between the lower ends of which is located a combined spacer and bearing member 15 through which a shaft 16 extends. Mounted upon opposite ends of the shaft are traction wheels 17 and 18, the former being spaced from its associated side 14 of the main frame 11 by a combined spacer and bearing member 19, and the other traction wheels 18 being spaced from its associated depending side 14 of the main frame 11 by gear mechanism, to be described hereinafter. The traction wheel 17 is keyed to the shaft 16, as is a ratchet wheel 20 cooperating with a pawl 21 mounted upon a pin 22 carried by a main sprocket wheel 23, said sprocket wheel also having laterally extending arms 24 and 25, to the former of which is secured a spring finger 26 for yieldably holding the associated pawl 21 in engagement with its ratchet wheel 20. Likewise, the arm 25 has secured to it a spring finger 27 for yieldably holding another pawl 28, also mounted upon the pin 22, in engagement with its associated ratchet wheel 29, the latter of which is secured to the hub 30 of traction wheel 18, the latter of which is loosely mounted upon the shaft 16. Power is transmitted from the engine 10 to the main sprocket wheel 23 and accordingly to the traction wheels 17 and 18 through a sheave 31 mounted upon one end of the engine cam shaft 32, there being a belt 32ª passing around said sheave 31 and also around a sheave 33 mounted upon a shaft 34, to which also is secured a sprocket wheel 35. A chain 36 passes around sprocket wheels 35 and 23 for transmitting power to the latter, whereby forward propelling movement is transmitted through the pawls and ratchet wheels to the traction wheels. The shaft 34 is mounted in a bearing 38 having depending arms 39 and 40 which are pivoted to a shaft 41, the latter being supported between the sides 14 of the main frame 11. Formed integrally with and extending upwardly from said bearing 38 is an arm 42, to the upper end of which is pivotally connected one end of a link 43, the opposite end of which is pivotally connected to one arm 44 of a bell crank lever 45, in turn pivotally connected at 46 to one of the two handle bars 47 which extend rearwardly from and are attached to the sides 14 of the main frame 11. By actuating the bell crank lever 45, the sheave 33 may be moved toward or away from the sheave 31 for loosening or tightening the driving belt with respect to said sheave for affecting the driving connection between the engine 10 and the traction wheels 17 and 18.

Referring to Figure 1, it will be noted that the sides 14 of the frame 11 are provided with a plurality of apertures 48 for the reception of button-like studs 49, (see Figure 5), the latter of which may be selectively placed in said apertures in accordance with requirements to be mentioned hereinafter. Intermediate the ends of the sides 14 of the frame 11 and near the top thereof similar button-like studs 50 are provided. Said studs 50 and 49 are respectively received within slots 51 and 52 formed in depending sides of a plate 53 forming a part of what I choose to call a holding frame, which also includes a central, longitudinally arranged piece of material 54, preferably of wood, having a plurality of elongated slots 55 and 56 formed therein, said slots being arranged at right angles with respect to each other. These slots 55 and 56 respectively movably receive bolts 57 and 58 which pass through and extend between oppositely arranged arms 59, forming a part of the handle bar mechanism of the lawn mower.

The lawn mower proper includes ground-engaging wheels 60 mounted upon an axle 61 and a cutting element 62 mounted upon the cutter bar shaft 63, which extends between pivotally mounted side plates 64 having rearwardly extending arms between which a roller 65 is mounted. Pivotally connected to the side plates 64 are side arms 66, the upper ends of which are turned laterally inwardly and are secured to a cross bar 67 in a manner such that the side arms 66 may be adjusted inwardly or outwardly with respect to each other for accommodating lawn mowers of different widths and styles. The arms 59 are secured to the cross bar 67.

From the above it is apparent that any lawn mower may be attached to the power unit by merely removing the ordinary wooden handle secured between the iron side arms 59 and then securing said arms 59 to the block 54 in the manner hereinbefore described, or by removing from the lawn mower the wooden handle bar together with its connecting members leading to the side plates 64 and substituting therefor the parts described herein, in which latter case mowers of various widths may be accommodated between the side bars 66. By providing the slots 55 and 56 in the block 54, it is apparent that the lawn mower is perfectly free to rise and fall with the irregularities encountered in the ground, the bolt 58 rising and falling in slot 56 and the bolt 57 sliding back and forth in substantially a horizontal line in the slot 55. In assembling the parts, the holding frame, including the block 54 and plate 53, the plate 53 is applied to the main frame by merely lifting the plate 53 and moving it rearwardly to the point where its slots 51 are received by the button-like studs 50, whereupon the plate and the parts attached thereto are lowered in a manner such that the slots 52 receive the button-like studs 49. With the parts thus arranged the main frame and the holding frame are interlocked with respect to each other and, as a matter of fact, may be positively held in such a position against accidental disconnection by passing a locking pin 68 through aligned apertures in the associated depending side walls of the main frame 11 and plate 53.

For yieldably holding the cutting mechanism in the proper position with respect to the ground, a spring 71 is provided, one end of which is connected to a bar 72 connected to the mower side plates 64 above the pivotal center thereof, and the other end of which spring is connected to a threaded member 73 which is adjustably secured to an arm 74 secured to the cross-bar 67.

If it is desired to use the power unit for the propulsion of garden tools or the like, the same may be done by attaching such tools through any one of a plurality of apertures 75 formed in the depending sides 14 of the main frame 11.

This combination provides a simple, efficient and durable power unit and attachment means therefor, whereby lawn mowers of various makes and sizes may be quickly and easily attached to and detached from said power unit, and whereby the various parts cooperate and function in a manner to meet all the requirements for a successful use, suitable provision also being made for the attachment of garden tools and the like to said power unit.

It is my intention to cover all modifications of the invention falling within the spirit and scope of the following claims.

I claim:

1. A power lawn mower combination including a two wheeled power propelled frame, means extending rearwardly therefrom for guiding same, lawn mower cutting mechanism, means for yieldably holding said lawn mower cutting mechanism in operative engagement with the ground, and means whereby said lawn mower cutting mechanism may be readily attached to and detached from the front of said frame and be pushed in advance thereof.

2. A power lawn mower combination including a power propelled frame, a holding frame having an interlocking relationship with said power propelled frame, a lawn mower having ground engaging portions, means for connecting said lawn mower to said holding frame whereby said mower is free to rise and fall with the irregularities of the ground, and means extending between the connecting means and the mower for maintaining ground engaging portions of the mower in engagement with the ground.

3. A power lawn mower combination including a power propelled frame having downwardly extending sides, a holding frame having an interlocking relationship with the downwardly extending sides of said power propelled frame, a lawn mower, and means for connecting said lawn mower to said holding frame whereby said mower is free to rise and fall with the irregularities of the ground.

4. A power lawn mower combination including a power propelled frame, a holding frame having an interlocking connection therewith, a lawn mower, means connecting said mower and holding frame whereby said means may move relatively to said holding frame as said mower moves over irregularities of the ground, and means extending between the connecting means and the mower for maintaining ground engaging portions of the mower in engagement with the ground.

5. A power lawn mower combination including a power propelled frame, a lawn mower, and an attachment between said frame and lawn mower whereby mowers of various sizes and styles may be readily attached to and detached from said frame, said attachment including a holding frame operatively associated with said power propelled frame, a member connected to said mower and having relative movement with respect to said holding frame as said mower moves over irregularities of the ground, and a spring joining the connecting means and the mower for maintaining ground engaging portions of the mower in engagement with the ground.

6. A power lawn mower combination including a power propelled frame having side walls with laterally extending projections, a lawn mower cutting unit, and an attachment between said cutting unit and power propelled frame including a handle holding frame having a plurality of slots for receiving said projections whereby the attachment may be quickly placed in and removed from operative position.

7. A power lawn mower combination including a power propelled frame having side walls with laterally extending projections, a lawn mower cutting unit, an attachment between said cutting unit and power propelled frame, including a handle holding frame having a plurality of slots for receiving said projections whereby the attachment may be quickly placed in and removed from operative position, and means for locking the attachment in position.

8. A power lawn mower combination including a power propelled frame, a lawn mower, and an attachment between said frame and lawn mower whereby mowers of various sizes and styles may be readily attached to and detached from said frame, said attachment including a holding frame operatively associated with said power propelled frame and a member connected to said mower and having relative movement with respect to said holding frame as said mower moves over irregularities of the ground, and means extending between the connecting member and the mower for yieldably holding the lawn mower cutting mechanism in operative association with the ground.

9. A power lawn mower combination including a power propelled frame having side walls with laterally extending projections, a lawn mower cutting unit, and an attachment between said cutting unit and power propelled frame including a handle holding frame having a plurality of slots for receiving said projections whereby the attachment may be quickly placed in and removed from operative position, said handle holding means permitting a relative movement with respect to the handle to accommodate movement of the lawn mower cutting mechanism in rising and falling over ground irregularities.

10. A power lawn mower combination including a power propelled frame having depending sides, projections extending laterally from said sides, a lawn mower attachment mechanism including a lawn mower handle holding frame with slots for receiving said projections for locating and holding the attachment within the frame.

11. A power lawn mower combination including a power propelled frame having depending sides, projections extending laterally from said sides, a lawn mower attachment mechanism including a lawn mower handle holding frame with slots for receiving said projections for locating and holding the attachment within the frame, said holding frame also having other slots arranged at right angles with respect to each other for accommodating rising and falling movements of the lawn mower handle connection occasioned by rising and falling movements of the lawn mower in passing over ground irregularities.

Signed at Chicago, Illinois, this 2nd day of November, 1921.

HARRY W. BOLENS.